(12) United States Patent
Viesselmann et al.

(10) Patent No.: US 6,655,121 B1
(45) Date of Patent: Dec. 2, 2003

(54) POWERED FEED ROLLER SYSTEM FOR A ROUND BALER

(75) Inventors: Kim P. Viesselmann, Grafton, WI (US); David William Tulloch, Masterton (NZ); Graeme Hugh Tulloch, Masterton (NZ)

(73) Assignee: Gehl Company, West Bond, WI (US)

( * ) Notice: Subject to any disclaimer, the term of this patent is extended or adjusted under 35 U.S.C. 154(b) by 149 days.

(21) Appl. No.: 09/636,427

(22) Filed: Aug. 10, 2000

(51) Int. Cl.$^7$ .............................................. A01D 39/00
(52) U.S. Cl. ......................................... 56/341; 100/88
(58) Field of Search ..................... 56/341, 343; 100/88, 100/89

(56) References Cited

U.S. PATENT DOCUMENTS

| | | |
|---|---|---|
| 1,673,921 A | 6/1928 | Sharp |
| 3,125,948 A | 3/1964 | Redding |
| 3,914,926 A * | 10/1975 | Braunberger et al. ......... 100/88 |
| 4,155,298 A | 5/1979 | Gaeddert et al. |
| 4,172,354 A | 10/1979 | Vermeer et al. |
| 4,182,101 A | 1/1980 | Gaeddert et al. |
| 4,399,746 A | 8/1983 | Viaud |
| 4,409,783 A | 10/1983 | Gaeddert |
| 4,422,373 A | 12/1983 | Gaeddert |
| 4,426,926 A | 1/1984 | Soteropulos et al. |
| 4,428,282 A | 1/1984 | Anstey |
| 4,436,027 A | 3/1984 | Freimuth et al. |
| 4,444,098 A | 4/1984 | Soteropulos |
| 4,510,741 A | 4/1985 | Campbell et al. |
| 4,581,879 A | 4/1986 | Anstey |

(List continued on next page.)

FOREIGN PATENT DOCUMENTS

| | | |
|---|---|---|
| EP | 0228944 | 7/1987 |
| EP | 0566204 | 10/1993 |

*Primary Examiner*—Robert E. Pezzuto
*Assistant Examiner*—Nathan Mammen
(74) *Attorney, Agent, or Firm*—Boyle, Fredrickson, Newholm, Stein & Gratz, S.C.

(57) ABSTRACT

A round baler for forming round bales of crop material includes a crop pickup which feeds crop material rearwardly toward a bale-forming chamber defined by a series of rollers in combination with a bale-forming section of a series of side-by-side baler belts. The series of rollers include front and rear floor rollers which rotate in the same direction, as well as an upper stripping roller and a powered feed roller. The powered feed roller cooperates with the front floor roller to define a crop inlet, and the feed roller and the front floor roller aggressively feed crop material into the bale-forming chamber. The front and rear floor rollers cooperate with the bale-forming section of the baler belts and the upper stripping roller to define an open initial bale-forming chamber. As the bale grows, the bale-forming section of the belts expands and the bale is supported by the rear floor roller without support from the front floor roller. The stripping roller is maintained in engagement with the bale, and strips crop material off of the baler belts downstream of the bale-forming section of the belts. The powered feed roller is mounted between a pair of pivotable arms which provide movement of the powered feed roller toward and away from the front floor roller in an arcuate path, to accommodate increases in thickness of the crop material supplied to the crop inlet. A spring is interconnected with the powered feed roller for biasing the powered feed roller toward a normal operating position, to maintain the powered feed roller in engagement with the crop material as the powered feed roller is moved toward and away from the front floor roller and to maintain the aggressive feeding action provided by the front floor roller and the powered feed roller. The arms may be pivotable about a pivot axis coincident with the axis of rotation of the stripping roller, so as to facilitate mounting and driving of the powered feed roller.

30 Claims, 5 Drawing Sheets

U.S. PATENT DOCUMENTS

| | | | |
|---|---|---|---|
| 4,619,106 A | * | 10/1986 | van der Lely ................ 100/89 |
| 4,648,239 A | | 3/1987 | Geiser et al. |
| 4,707,974 A | | 11/1987 | Harthoorn |
| 4,782,652 A | | 11/1988 | White |
| 4,788,900 A | | 12/1988 | Berkers |
| 4,870,812 A | | 10/1989 | Jennings et al. |
| 4,910,949 A | | 3/1990 | Meyer |
| 5,080,009 A | | 1/1992 | Fritz et al. |
| 5,097,760 A | | 3/1992 | Ratzlaff et al. |
| 5,165,333 A | | 11/1992 | Ratzlaff et al. |
| 5,181,461 A | | 1/1993 | Viaud |
| 5,191,833 A | | 3/1993 | Clevenger, Jr. |
| 5,193,450 A | | 3/1993 | Anderson |
| 5,301,495 A | | 4/1994 | Van Zee |
| 5,347,801 A | | 9/1994 | McIlwain |
| 5,394,682 A | | 3/1995 | Frimml et al. |
| 5,408,925 A | | 4/1995 | McClure et al. |
| 5,419,108 A | | 5/1995 | Webb et al. |
| 5,426,928 A | | 6/1995 | Frimml et al. |
| 5,519,990 A | | 5/1996 | Rodewald et al. |
| 5,768,986 A | * | 6/1998 | Arnold et al. ................ 100/88 |
| 5,913,805 A | * | 6/1999 | Vodon ........................ 100/88 |
| 5,931,089 A | | 8/1999 | Viesselmann et al. |
| 5,941,168 A | * | 8/1999 | Kluver et al. ................ 100/87 |
| 6,170,245 B1 | * | 1/2001 | Underhill .................... 100/88 |
| 6,272,825 B1 | * | 8/2001 | Anderson et al. ............ 100/88 |
| 6,332,309 B1 | * | 12/2001 | Rodewald .................... 100/88 |

* cited by examiner

POWERED FEED ROLLER SYSTEM FOR A ROUND BALER

BACKGROUND AND SUMMARY OF THE INVENTION

This invention relates to a baler for forming round bales of agricultural crop material, and more particularly to a crop material feeding arrangement for a variable chamber round baler having a belt arrangement defining an expandable chamber within which a round bale of crop material is formed.

Round balers for agricultural crop material typically include a pickup for lifting crop material off the ground and feeding crop material rearwardly into a bale-forming chamber. Viesselmann et al U.S. Pat. No. 5,931,089, the disclosure of which is hereby incorporated by reference, illustrates a bale-forming chamber which is defined by a floor roller in combination with a bale-forming section defined by a series of side-by-side belts, an upper stripping roller and an initial bale-forming roller. Crop material is supplied to the floor roller and then engages the bale-forming section of the belts. The stripping roller and the initial bale-forming roller impart rotation to the crop material to form a rotating bale core. The bale-forming section of the belts expands as the bale grows, and the bale is eventually forced rearwardly out of contact with the initial bale-forming roller. The bale continues to grow within the baler as crop material is supplied by the pickup and floor roller until the bale attains a desired size, and the formed bale is then wrapped with twine or net-type wrap material and discharged from the baler.

In the design disclosed in the '089 patent, incoming crop material from the pickup is supplied to the bale-forming area simply by engagement with the lower floor roller. While this arrangement functions satisfactorily, there is a need in certain crop conditions for providing a more active, aggressive arrangement for feeding crop material into the bale-forming chamber and for providing a configuration of bale-forming components which facilitates easy bale starting and bale formation, and which is operable to form bales which are tightly packed so as to maintain bale shape and strength when formed.

It is an object of the present invention to provide a crop material feeding system which actively forces crop material into the bale-forming chamber of a round baler, to ensure that the crop material reaches the bale-forming chamber and to facilitate formation of the bale. It is further object of the invention to provide such a system which is capable of feeding varying types of crop material, which may vary in thickness, into the bale-forming chamber. Yet another object of the invention is to provide such a system which is capable of preventing buildup of crop material on components of the baler which define the bale-forming chamber. A still further object of the invention is to provide such a system which is relatively simple in its components and manufacture, yet which provides highly satisfactory feeding of crop material into the bale-forming chamber, both during initial bale formation as well as during growth of the bale after initial formation. Yet another object of the invention is to provide such a system which incorporates an efficient and effective drive system for a powered crop material intake, while accommodating movement of a powered feed roller to enable variations in the size of the crop material inlet.

In accordance with the invention, a round baler for forming round bales of agricultural crop material includes a pickup for moving crop material rearwardly toward a bale-forming chamber, which is defined at least in part by a bale-forming section of a movable belt arrangement incorporated in the baler. The bale-forming section of the belt arrangement is located between a pair of spaced baler rollers. The invention contemplates a pair of rollers located between the pickup and the bale-forming chamber which rotate in opposite directions so as to positively feed crop material into the bale-forming chamber. The baler includes a stationary rear floor roller located below the bale-forming section of the belt arrangement, as well as an upper bale-forming member, preferably in the form of a roller, located above and forwardly of the rear floor roller. The bale-forming section of the belt arrangement extends between the rear floor roller and the upper bale-forming member. The pair of rollers contemplated by the invention are preferably in the form of a front floor roller located forwardly of the rear floor roller and below the upper bale-forming member, and a powered feed roller located between the upper bale-forming member and the front floor roller. An initial bale-forming chamber is defined by the front and rear floor rollers in combination with the bale-forming section of the belt arrangement, the upper bale-forming member and the powered feed roller. The inlet for supplying crop material to the initial bale-forming chamber is defined by a space between the powered feed roller and the front floor roller. The front floor roller and the powered feed roller are driven in opposite directions of rotation, so as to act on crop material supplied by the crop pickup and to force the crop material rearwardly into the bale-forming chamber.

The powered feed roller is movable away from the front floor roller, so as to increase the size of the crop inlet defined by the space between the powered feed roller and the front floor roller, to accommodate an increase in the thickness of crop material supplied to the bale-forming chamber. In one embodiment, the powered feed roller is mounted between a pair of arms which are pivotably interconnected with the baler, for providing movement of the powered feed roller in an arcuate path toward and away from the front floor roller. A biasing arrangement is operable to urge the powered feed roller toward a normal operating position in which the powered feed roller is spaced a predetermined minimum distance from the front floor roller. As the thickness of crop material supplied to the crop inlet increases, the powered feed roller is pivotable away from the front floor roller to accommodate passage of the thicker crop material into the bale-forming chamber, against the force of the biasing arrangement. The arms are preferably mounted for pivoting movement about a pivot axis which is coincident with an axis of rotation defined by the upper bale-forming roller.

A scraper arrangement is provided for removing crop material which adheres to the upper bale-forming roller and to the powered feed roller. The scraper arrangement includes a scraper support member located between the upper bale-forming roller and the powered feed roller, and a pair of scraper members mounted to the scraper support structure. Each scraper member includes a scraping edge or surface located adjacent a surface of either the upper bale-forming roller or the powered feed roller, for removing crop material upon rotation of the upper bale-forming roller and the powered feed roller. In a preferred form, the upper bale-forming roller and the powered feed roller include helical surface structure which cooperates with the scraping surfaces to sever crop material adhering to the upper bale-forming roller and the powered feed roller.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
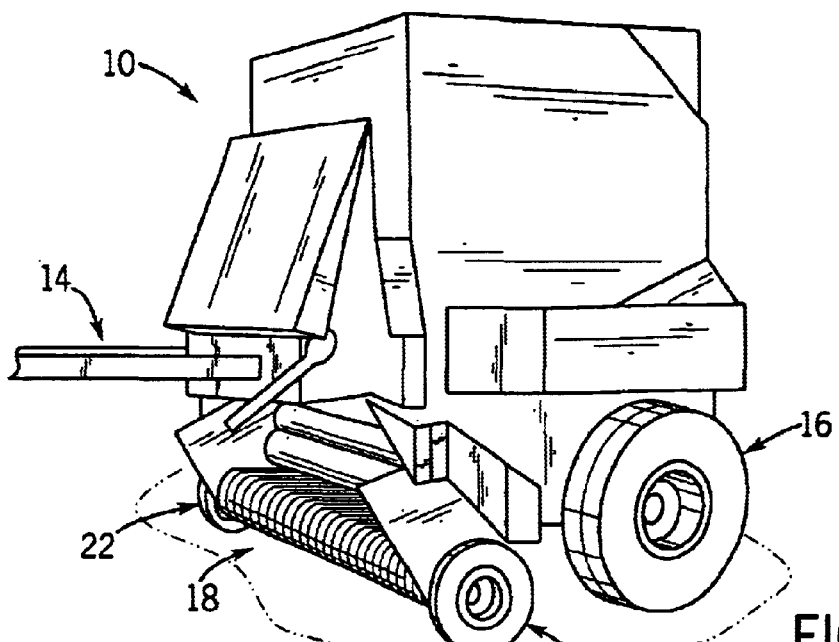
FIG. 1 is an isometric view of a round baler incorporating the powered feed system of the present invention.
Figure 2:
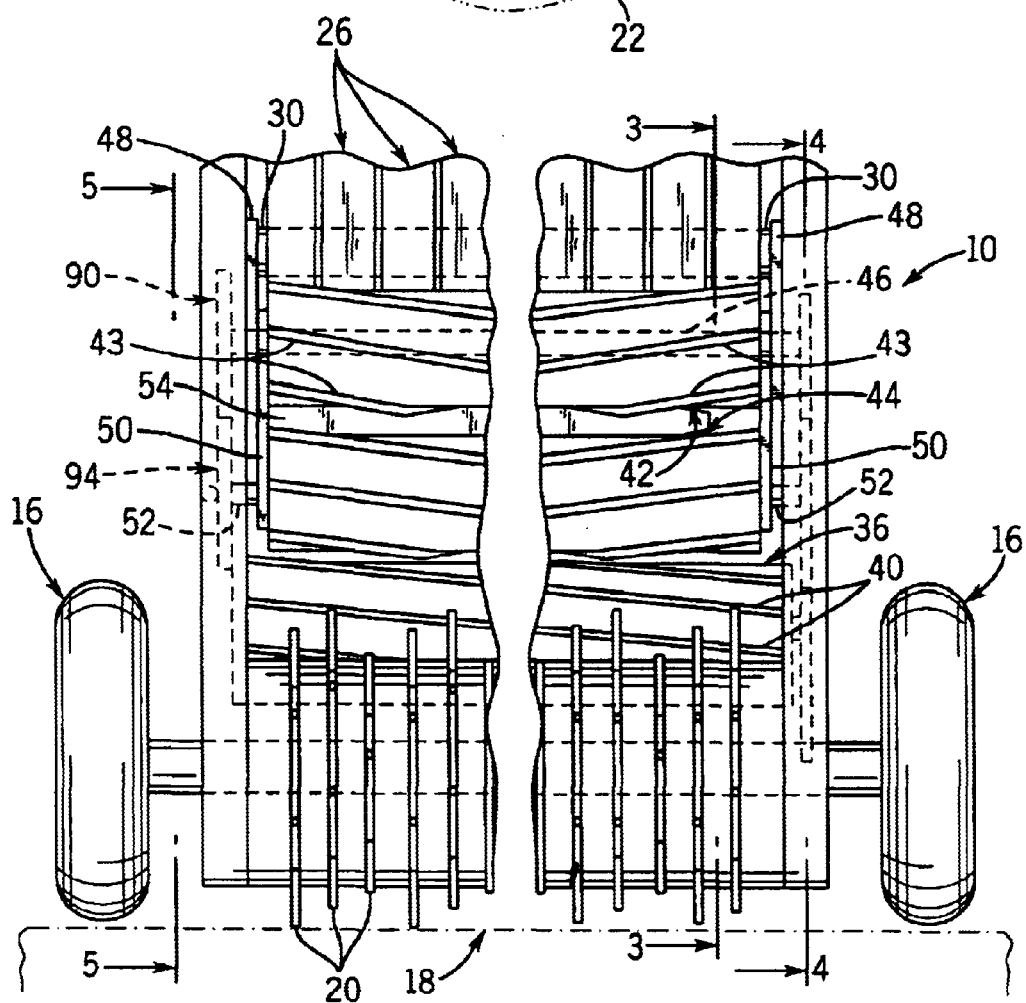
FIG. 2 is a partial front elevation view of the round baler of FIG. 1, with portions removed.
Figure 3:
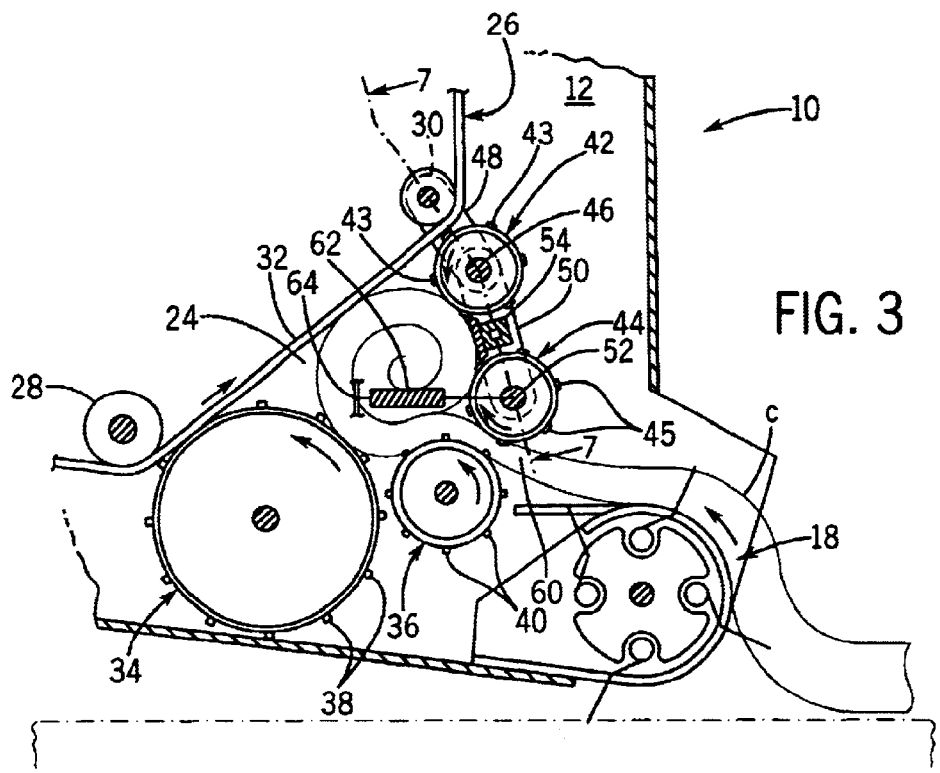
FIG. 3 is a partial section view taken along line 3—3 of FIG. 2.

Referring to FIGS. 1–3, a belt-type, variable chamber round baler 10 generally includes a pair of side panels, one of which is shown at 12 (FIG. 3), spaced from each other and assembled to a frame assembly. Baler 10 includes a forwardly-extending tongue 14 which adapted for connection to a tractor (not shown), behind which baler 10 is adapted to be pulled. The frame of baler 10 carries a pair of ground-engaging wheels 16, for providing movement of baler 10 along the ground. A crop pickup mechanism 18 is located at the lower forward area of baler 10, and includes a series of tines 20 which pick up crop material from the ground and feed crop material rearwardly. Pickup mechanism 18 includes a pair of ground-engaging wheels 22. These components of baler 10 and their operation are known in the art.

Referring to FIG. 3, baler 10 includes an initial bale-forming chamber 24 for receiving crop material from pickup mechanism 18. Initial bale-forming chamber 24 is located between side panels 12, and is defined by a series of side-by-side baler belts, shown at 26, in combination with a series of bale-forming members located forwardly thereof. Belts 26 are trained about a series of baler rolls, including a lower idler roller 28 and an upper guide roller 30. The run of belts 26 between lower guide roller 28 and upper guide roller 30 defines a bale-forming section 32.

The bale-forming members located forwardly of bale-forming section 32 of belts 26 are in the form of roller members. As shown, the bale-forming members include a lower rear floor roller 34 and a lower front roller 36. Rear floor roller 34 has a significantly larger diameter than that of front floor roller 36, and is adapted to support the weight of a full bale when formed. Representatively, rear floor roller may have a diameter of approximately sixteen inches and front floor roller 36 may have a diameter of approximately eight inches. The upper extent of front floor roller 36 is slightly below that of rear floor roller 34, and front floor roller 36 is oriented so as to receive crop material which is moved rearwardly by pickup mechanism 18. Both rear floor roller 34 and front floor roller 36 rotate rearwardly, i.e. counterclockwise with reference to FIG. 3, such that crop material from crop pickup mechanism 18 is moved rearwardly by front floor roller 36 toward rear floor roller 34, and rearwardly by rear floor roller 34 toward bale-forming section 32 of belts 26. The surface of rear floor roller 34 includes a series of transversely extending bars 38, which may extend along the longitudinal axis of rear floor roller 34 or which may have a slightly angled or helical orientation. Similarly, the surface of front floor roller 36 includes a series of transversely extending bars 40, which may extend along the longitudinal axis of front floor roller 36 or which may have a slightly angled or helical orientation. Bars 38, 40 function to actively engage crop material as the crop material is supplied rearwardly by crop pickup mechanism 18, upon rotation of rollers 34, 36, respectively. Rear floor roller 34 is located such that bars 38 contact or are in close proximity to the facing surfaces of belts 26 at the lower extent of bale-forming section 32 of belts 26.

Initial bale-forming chamber 24 is further defined by a stationary upper stripping roller 42 and a powered feed roller 44. Upper stripping roller 42 is located above both rear floor roller 34 and front floor roller 36, and the axis of rotation of upper stripping roller 42 is located slightly forwardly of the axis of rotation of front floor roller 36. Upper stripping roller 42 includes a series of angled or helical bars 43 (FIGS. 2, 3) which cooperate to form a series of shallow V-shaped cleats on the outer surface of stripping roller 42. The outer surfaces of bars 43 are located in close proximity to the facing surfaces of belts 26 at the location where belts 26 engage upper guide roller 30. In a similar manner, powered feed roller 44 includes a series of angled or helical bars 45 (FIGS. 2, 3) which cooperate to form a series of shallow V-shaped cleats on the outer surface of powered feed roller 44.

Upper stripping roller 42 includes a rotatable shaft 46, the longitudinal axis of which defines the axis of rotation of upper stripping roller 42. Upper guide roller 30 is mounted between a pair of arms or link members 48, each of which is located adjacent one of baler side panels 12 and is mounted for pivoting movement about a pivot axis coincident with the axis of rotation of upper stripping roller 42. Illustratively, arms 48 may be pivotably mounted to stripping roller shaft 46. With this construction, upper guide roller 30 is movable in an arcuate path relative to upper stripping roller 42 during bale growth. Upper guide roller 30 functions to maintain the surfaces of belts 26 in close proximity to bars 43 of upper stripping roller 42, to enable stripping roller 42 to strip crop material from belts 26. This construction and operation is illustrated and described in Viesselmann et al U.S. Pat. No. 5,931,089.

Powered feed roller 44 is mounted between a pair of link members or arms 50, each of which is located adjacent one of baler side panels 12. In a manner similar to arms 48, arms 50 are mounted for pivoting movement about a pivot axis coincident with the axis of rotation of upper stripping roller 42, i.e. concentric with the longitudinal axis of shaft 46. Powered feed roller 44 includes a shaft 52, which is rotatably mounted at its ends to one of arms 50 for rotatably mounting powered feed roller 44 to and between arms 50. With this construction, powered feed roller 44 is movable in an arcuate path about a pivot axis defined by the longitudinal axis of stripping roller shaft 46. Arms 48 and 50 are movable independently of each other, such that powered feed roller 44 is movable independent of guide roller 30.

Figure 7:
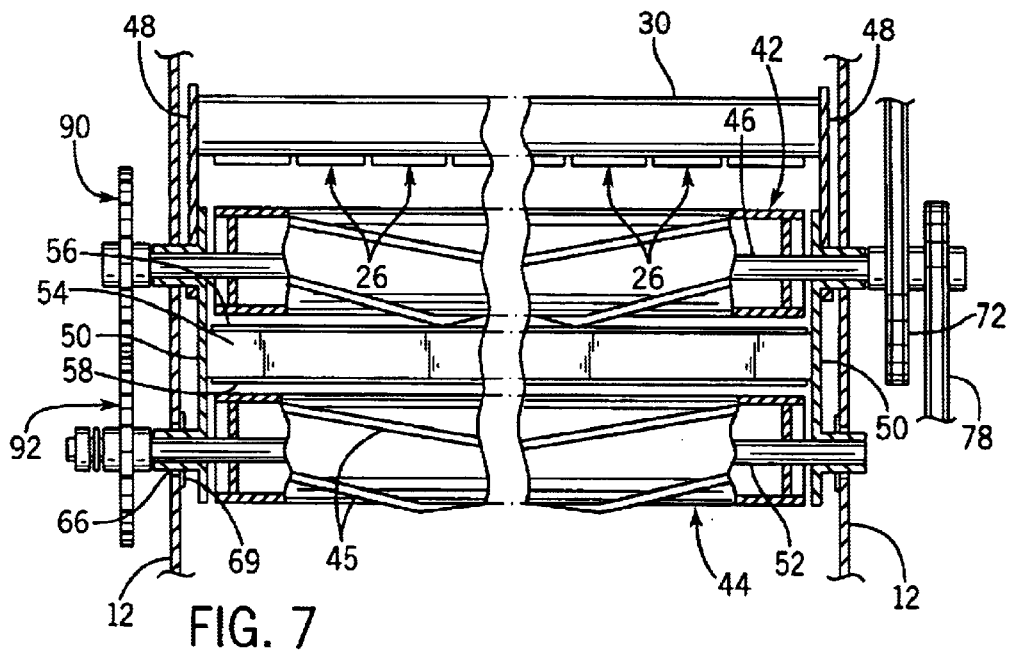
FIG. 7 is a partial section view taken along line 7—7 of FIG. 3.
Figure 10:
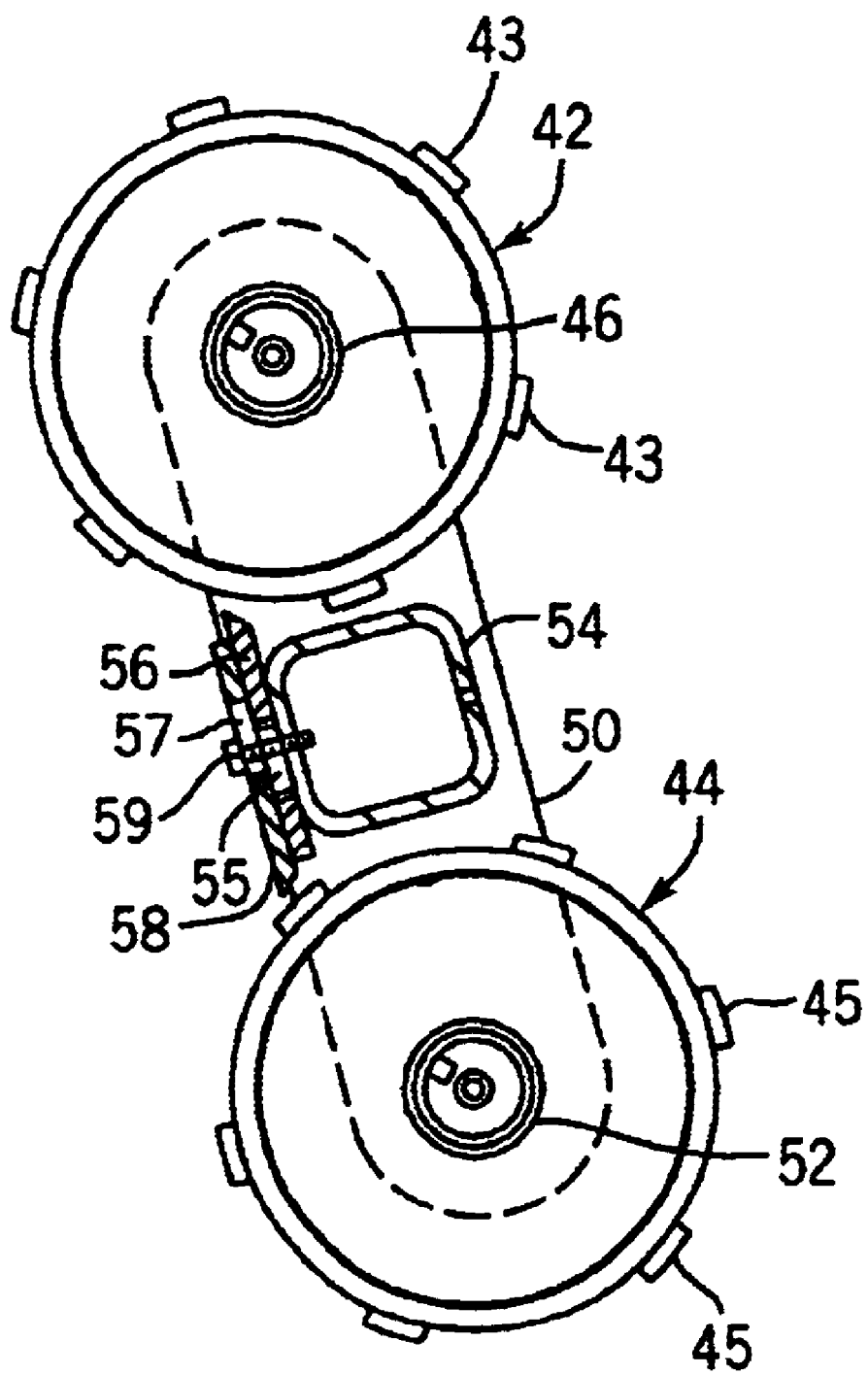
FIG. 10 is an enlarged partial section view illustrating the upper stripping roller, the powered feed roller and the scraping arrangement incorporated into the powered feed system of the invention.

As shown in FIGS. 3, 7 and 10, a tubular scraper mounting member 54 extends between arms 50. Scraper mounting member 54 is located between upper stripping roller 42 and powered feed roller 44, extending along a longitudinal axis parallel to the longitudinal axes of shafts 46, 52. A pair of scraper members 56, 58 are mounted to scraper mounting member 54. Scraper member 56 defines an upper scraping edge located adjacent the surfaces of bars 43 mounted to stripping roller 42, and scraper member 58 defines a scraping edge located adjacent the surfaces of bars 45 mounted to powered feed roller 44.

Scraper members 56, 58 are interconnected with scraper mounting member 54 by means of a series of threaded fasteners, such as screws 59, which extend through aligned slots 55, 57 formed in scraper members 56, 58, respectively, and into a threaded opening formed in a wall of scraper mounting member 54. With this construction, the scraping edges of scraper members 56, 58 can be adjustably positioned closely adjacent the surfaces of bars 43, 45 mounted respectively to stripping roller 42 and powered feed roller 44, for scraping material adhering thereto upon rotation of stripping roller 42 and powered feed roller 44. By tightening screws 59 toward scraper mounting member 54, scraper members 56, 58 are sandwiched between the heads of screws 61 and the surface of scraper mounting member 54, for securely engaging scraper members 56, 58 with scraper mounting member 54. With this arrangement, crop material scraped from the surfaces of stripping roller 42 and powered feed roller 44 fall either into the bale during formation or onto the incoming stream of crop material, for formation into the bale.

FIG. 3 illustrates arms 50 located so as to place powered feed roller 44 in a normal operating position. In this position, powered feed roller 44 is spaced a minimum distance from the outer surface of front floor roller 36, defining a crop inlet 60 therebetween. In a manner to be explained, powered feed roller 44 rotates so as to feed crop material inwardly toward bale-forming chamber 24, i.e. in a clockwise direction as shown in FIG. 3. Front floor roller 36 rotates in a counter-clockwise direction, such that front floor roller 36 and powered feed roller 44 cooperate to aggressively and actively force crop material supplied to crop inlet 60 rearwardly into initial bale-forming chamber 24.

Figure 5:
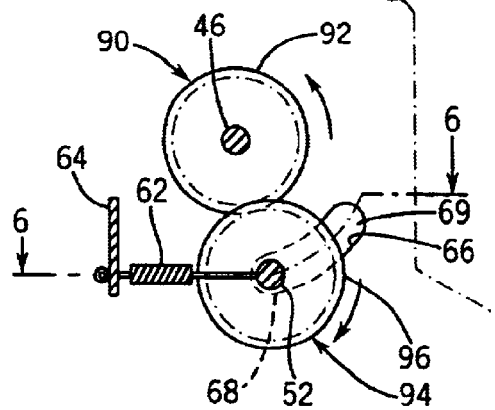
FIG. 5 is a partial section view taken along line 5—5 of FIG. 2.

A spring, shown at 62, is interconnected between powered feed roller shaft 52 and a fixed-position component of baler 10, shown at 64. Spring 62 functions to bias powered feed roller 44 and arms 50 toward the normal operating position of FIG. 3, wherein crop inlet 60 is at its minimum width. Referring to FIG. 5, powered feed roller shaft 52 has an end which extends through an arcuate slot 66 formed in one of baler side panels 12. Alternatively both ends of powered feed roller shaft 52 may extend through arcuate slots such as 66 formed in the side panels 12 of baler 10. FIG. 5 illustrates powered feed roller shaft 52 in its innermost position as illustrated in FIG. 3, wherein the inner end of slot 66, shown at 68, limits movement of powered feed roller shaft 52 so as to position powered feed roller 44 as shown. That is, spring 62 urges powered feed roller shaft 52 toward the inner end 68 of slot 66 such that, in this position, powered feed roller 44 and front floor roller 36 define the minimum width of crop inlet 60.

Figure 6:
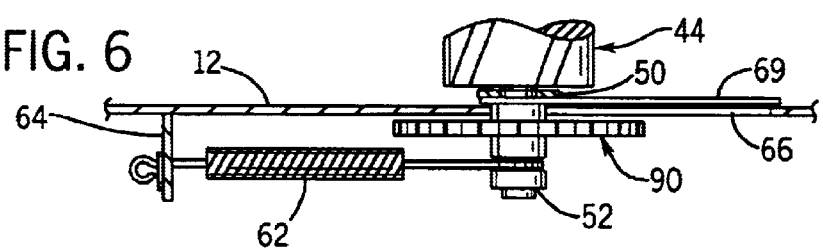
FIG. 6 is a partial section view taken along line 6—6 of FIG. 5.

Referring to FIGS. 5–7, a thin, arcuate filler member 69 is carried by one of arms 50. Filler member 69 functions to close the area of arcuate slot 66 when powered feed roller 44 is in its normal operating position, so as to prevent crop material from exiting through slot 66.

Figure 4:
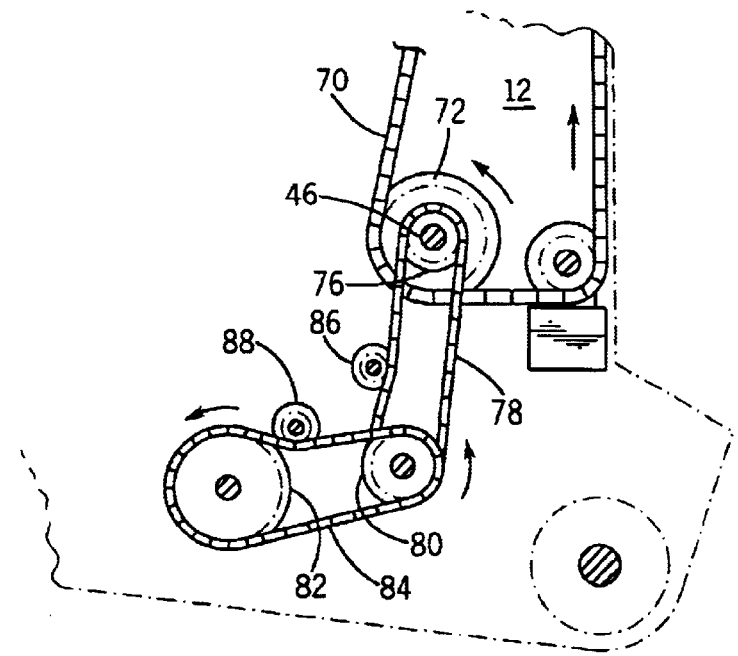
FIG. 4 is a partial section view taken along line 4—4 of FIG. 2.

FIGS. 4 and 5 illustrate the drive system for imparting rotation to rear floor roller 34, front floor roller 36, upper stripping roller 42 and powered feed roller 44. As shown, a conventional primary baler drive system includes a drive chain 70 which engages a sprocket 72 interconnected with upper stripping roller 42 for imparting rotation to upper stripping roller 42 in response to movement of drive chain 70. A reduced diameter sprocket 76 is mounted to and rotatable with sprocket 72, and a chain 78 is engaged with sprocket 76. Chain 78 engages a sprocket 80, which is interconnected with the shaft of front floor roller 36. A sprocket 82 is engaged with the shaft of rear floor roller 34, and a chain 84 is engaged with the teeth of sprockets 80, 82. Chain tensioning sprockets 86, 88 are engaged with chains 78, 84, respectively, for maintaining proper tension in chains 78, 84.

The opposite side of baler 10, outside the opposite side panel 12, is illustrated in FIG. 5. As shown, a gear 90 is mounted to stripping roller shaft 46, and includes a series of teeth 92 on its outer periphery. Similarly, a gear 94 is mounted to powered feed roller shaft 52, and includes a series of teeth 96 on its outer periphery which mesh with teeth 92 of gear 90. In this manner, rotary power imparted to stripping roller shaft 46 through primary drive chain 70 and drive sprocket 72, is transferred through gears 90, 94 to powered feed roller shaft 52, so as to impart rotation to powered feed roller 44 simultaneously with rotation of stripping roller 42.

In operation, baler 10 functions as follows to form round bales of crop material.

As baler 10 is moved along the ground, pickup mechanism 18 functions to lift crop material C off of the ground and to feed crop material C rearwardly toward crop inlet 60. As crop material C enters crop inlet 60, crop material C is engaged by the outer surfaces of front floor roller 36 and powered feed roller 44, including transverse bars 40 on front floor roller 36 and helical bars 45 on the outer surface of powered feed roller 44. The uneven, aggressive surfaces of front floor roller 36 and powered feed roller 44 actively engage crop material C and move crop material C through crop inlet 60 rearwardly into engagement with rear floor roller 34. Transverse bars 38 of rear floor roller 34 provide positive engagement with crop material C to direct crop material C rearwardly and upwardly toward bale-forming section 32 of baler belts 26, which move in an upward and forward direction between lower idler roller 28 and upper guide roller 30. Such movement of bale-forming section 32 of baler belts 26 directs crop material upwardly and forwardly toward stripping roller 42. The helical bars 43 of upper stripping roller 42 engage crop material C and direct crop material C downwardly and forwardly, to initiate coiling of crop material C within initial bale-forming chamber 24. As crop material C continues to be fed into initial bale-forming chamber 24 in this manner, a bale core grows within initial bale-forming chamber 24 as illustrated in FIG. 3. During initial bale formation, the bale core is supported by both rear floor roller 34 and front floor roller 36.

Figure 8:
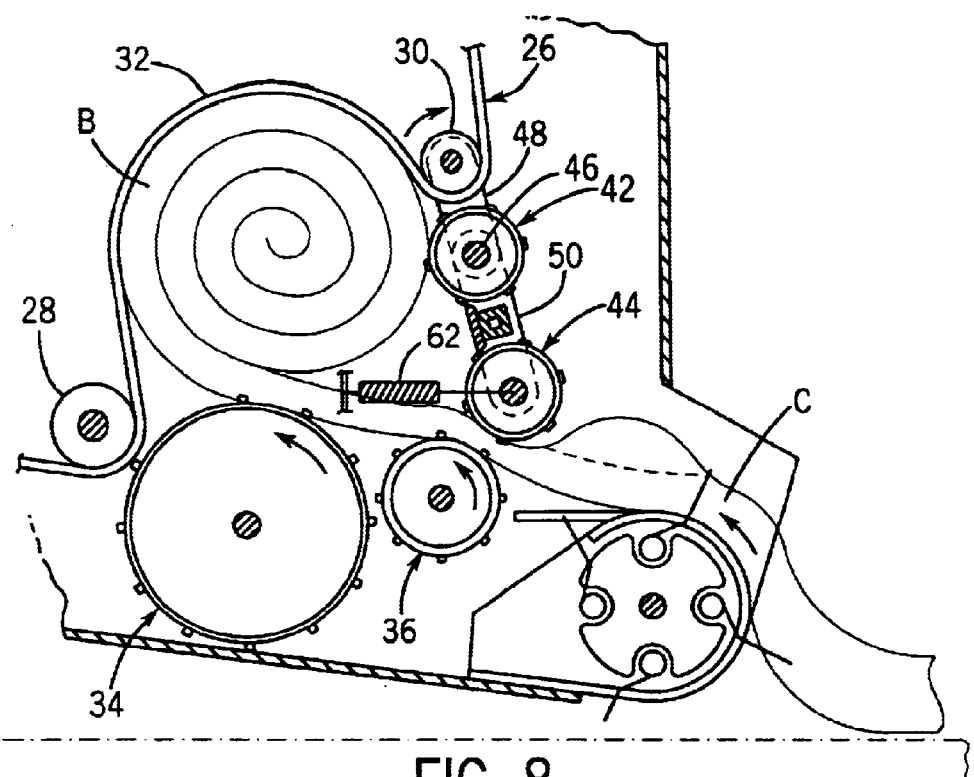
FIGS. 8 and 9 are views similar to FIG. 3, illustrating movement of the powered feed roll for accommodating introduction of crop material having an increased thickness into the bale-forming chamber.
Figure 9:
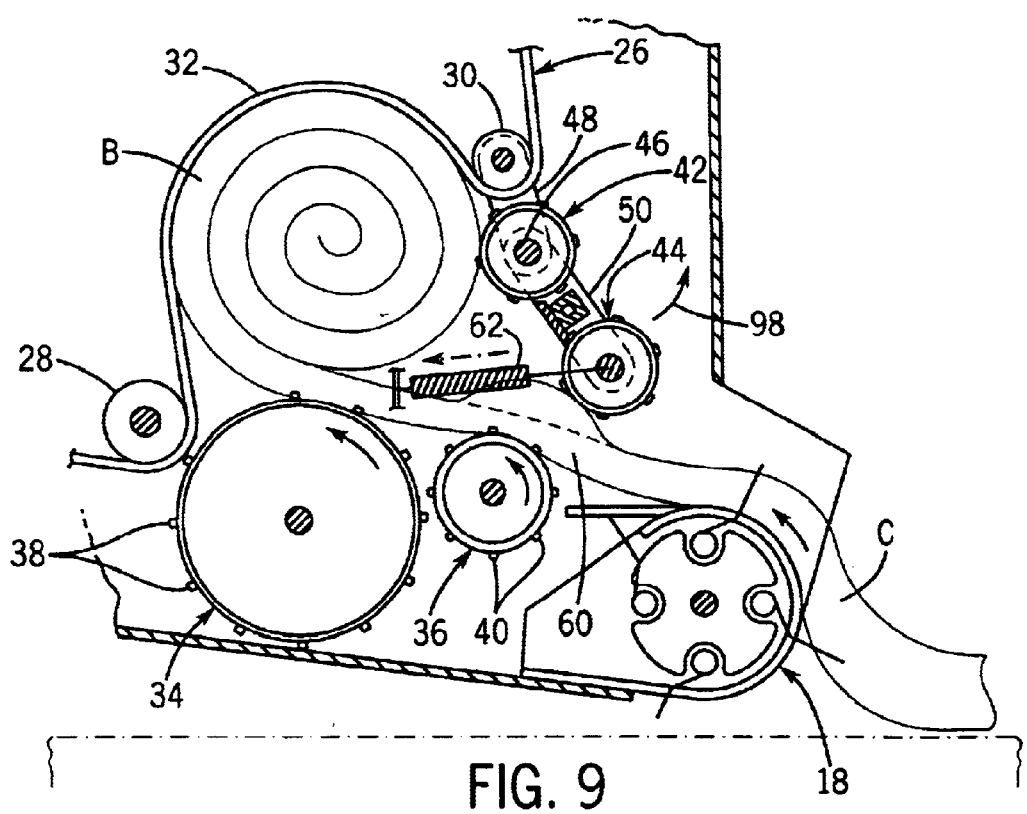

As crop material C continues to be fed into initial bale-forming chamber 24, the bale core continues to grow and causes bale-forming section 32 of baler belts 26 to expand, as shown in FIGS. 8 and 9. The bale, shown at B, moves out of initial bale-forming chamber 24 and is then supported by rear floor roller 34. Subsequently, as growth of bale B continues, bale B moves onto and is primarily supported by lower idler roller 28. During bale growth, arms 48, to which upper guide roller 30 is mounted, pivot about stripping roller shaft 46 in a clockwise direction, to maintain belts 26 in engagement with bale B and to provide passage of belts 26 in close proximity to stripping roller 42. The helical stripping bars 43 of stripping roller 42 function to remove any crop material adhering to the surfaces of belts 26, and any such removed crop material either falls into the incoming stream of crop material C or remains on the surface of stripping roller 42. Scraper member 56 is operable to remove crop material adhering to the surface of stripping roller 42, and cooperates with helical bars 43 of stripping roller 42 to shear such crop material. The spaces between helical bars 43 provide relief areas for the sheared crop material, which falls by gravity into the incoming stream of crop material C.

At times, the incoming stream of crop material C can include a "lump" of crop material, as shown in FIGS. 6 and 7, or the thickness of the incoming stream of crop material may simply exceed the height of crop inlet 60. When this occurs, arms 50, to which powered feed roller 44 is mounted, pivot in a counterclockwise direction about stripping roller drive shaft 46, as illustrated at arrow 98 in FIG. 7. Powered feed roller 44 is pivoted upwardly and forwardly, in the arcuate path defined by pivoting movement of arms 50, away from front floor roller 36 to increase the height of crop inlet 60 and to allow passage of the "lump" of crop material C, or the incoming stream of crop material C of increased thickness, through crop inlet 60. Spring 62 functions to bias powered feed roller 44 in a clockwise direction, to ensure positive engagement of powered feed roller 44 with the incoming crop material C. In this manner, the aggressive feeding action provided by front floor roller 36 and powered feed roller 44 is maintained while accommodating variations in the thickness of crop material C. When the thickness of crop material C again decreases, the biasing force of spring 62 functions to return powered feed roller 44 to its normal operating position of FIGS. 3 and 6.

During movement of powered feed roller 44 as described, powered feed roller shaft 52 is moved within arcuate slot 66 and teeth 96 of gear 94 remain in engagement with teeth 92 of gear 90. In this manner, powered feed roller 44 continues to be driven at all times during movement toward and away from front floor roller 36, to provide positive feeding of crop material C during bale formation. In addition, filler member 69 moves along with powered feed roller shaft 52 as powered feed roller shaft 52 moves within arcuate slot 66. Filler member 69 slides along the inside surface of slide panel 12 over slot 66, and is constructed such that the void defined by slot 66 is covered throughout the entire range of movement of powered feed roller shaft 52 within slot 66. Filler member 69 thus prevents crop material from exiting the bale-forming chamber through slot 66.

The invention thus provides a round baler construction having an open initial bale-forming chamber to facilitate starting of the bale core and which provides aggressive feeding of crop material into the bale, both during initial formation and subsequent bale growth. The positive crop feeding feature provides a variable crop inlet area while maintaining crop feeding action from both the top and the bottom of the incoming stream of crop material. The powered crop feeding system provides ease of operation in bale core formation and subsequent bale growth, and includes features providing removal of crop material or "trash" from the baler belts at both the entrance and exit of the belts to and from the bale-forming area. The system also provides removal of "trash" material from the stripping roller and powered feed roller, to prevent buildup of such crop material which can adversely affect operation of baler 10.

The drawings and description illustrate but one embodiment of the present invention, and numerous variations in components or construction are contemplated as being within the scope of the invention. For example, the drawings illustrate use of two floor rollers, namely rear floor roller 34 and front floor roller 36. It is contemplated that a single floor roller could be employed, or that one or both of the floor rollers may be replaced with any other satisfactory type of movable member which is capable of both moving crop material and supporting a bale during formation, such as a belt-type or chain-type apron structure or the like. In addition, both upper guide roller 30 and powered feed roller 44 are illustrated as being movable in an arcuate path centered on the axis of rotation of stripping roller 42. As set forth in Viesselmann et al U.S. Pat. No. 5,931,089, upper guide roller 30 may be mounted eccentrically relative to stripping roller shaft 46, or alternatively may be mounted in any other manner so as to be movable during bale growth, such as within arcuate slots formed in baler side panels 12. Similarly, powered feed roller 44 may be movably mounted to baler 10 other than through pivotable mounting of arms 50 to stripping roller shaft 46, so long as any such mounting arrangement accommodates movement of powered feed roller 44 toward and away from front floor roller 36 and accommodates driving of powered feed roller 44. For example, arms 50 may be eliminated and powered feed roller 44 and its associated shaft 52 received with in slots formed within baler side panels 12, for accommodating movement of powered feed roller 44 relative to front floor roller 36. Powered feed roller 44 may be driven independently of upper stripping roller 42, using any type of drive arrangement which accommodates such movement of powered feed roller 44. In addition, while powered feed roller 44 has bee illustrated as being movable in a path concentric with the axis of rotation of stripping roller 42, it is understood that powered feed roller may be mounted eccentrically relative to the axis of stripping roller 42, or may be movable in any other path or direction independent of any relationship to stripping roller 42. Further, when arms such as 50 are employed, spring 62 may be eliminated and replaced with a torsion spring arrangement or the like which biases powered feed roller 44 toward its normal operating position. Alternatively, any use of springs to bias arms 50 and powered feed roller 44 may be eliminated, and a gravity bias may be employed.

The invention as shown and described contemplates the powered feed roller 44 as being movable relative to front floor roller 36 to accommodate variations in thickness of crop material. It is also understood that the invention contemplates that a lower roller, such as front floor roller 36, may be movable relative to a fixed-position or stationary upper roller, such as powered feed roller 44. It is also understood that the invention contemplates that the pair of oppositely rotatable rollers, such as front floor roller 36 and powered feed roller 44, may both be stationary and spaced apart from each other a distance sufficient to accommodate a maximum known crop material thickness. However, it is preferred that rollers 36 and 44 be maintained close together, so as to positively engage the crop material top and bottom to feed the-crop material into the bale-forming chamber.

These variations are representative of any number of variations which are possible and which are contemplated as being within the scope of the present invention.

Various alternatives and embodiments are contemplated as being within the scope of the following claims particularly pointing out and distinctly claiming the subject matter regarded as the invention.

We claim:

1. A round baler for forming round bales of crop material, comprising:

a crop pickup for feeding crop material rearwardly;

a belt arrangement located rearwardly of the crop pickup and including a bale-forming section located between a pair of baler rollers;

at least one floor roller located forwardly of the bale-forming section of the belt arrangement;

a fixed-position upper bale-forming roller located forwardly of the bale-forming section of the belt arrangement and located above the floor roller;

wherein a bale-forming chamber is defined by the bale-forming roller, the floor roller and the bale-forming section of the belt arrangement; and a powered feed roller located below the upper bale-forming roller and above the floor roller, wherein the powered feed roller cooperates with the floor roller to define a crop inlet therebetween for receiving crop material from the crop pickup and feeding crop material rearwardly to the bale-forming chamber, wherein the powered feed roller is movable relative to the floor roller to vary the size of the crop inlet, and wherein the bale-forming chamber is configured such that the floor roller supports the bale from below during formation of the bale in the bale-forming chamber.

2. The round baler of claim 1, wherein the floor roller comprises a forward floor roller, and further comprising a rear floor roller located between the forward floor roller and the bale-forming section of the belt arrangement, wherein the forward floor roller and the rear floor roller cooperate to support the bale from below during initial formation of the bale, and wherein the bale is subsequently shifted rearwardly and is supported by the rear floor roller without support from the forward floor roller.

3. The round baler of claim 1, further comprising a biasing arrangement interconnected with the powered feed roller for biasing the powered feed roller toward a normal operating position in which the powered feed roller is spaced a first distance from the floor roller, and wherein the powered feed roller is movable against the force of the biasing arrangement to an expanded position, in which the spacing of the powered feed roller from the floor roller is greater than the first distance, to accommodate an increase in thickness of the crop material.

4. The round baler of claim 3, wherein the powered feed roller is mounted between a pair of arm members pivotably interconnected with the round baler.

5. The round baler of claim 4, wherein the pair of arm members are pivotably mounted for movement about a pivot axis coincident with an axis of rotation defined by the upper bale-forming roller.

6. The round baler of claim 5, further comprising a scraper member located between the powered feed roller and the upper bale-forming roller, wherein the scraper member is arranged to remove crop material from the powered feed roller and the upper bale-forming roller.

7. The round baler of claim 6, wherein the scraper member is mounted to a cross member extending between the pair of arm members.

8. A round baler for forming round bales of crop material, comprising:

a crop pickup for feeding crop material rearwardly;

a belt arrangement located rearwardly of the crop pickup and including a bale-forming section located between a pair of baler rollers;

at least one floor roller located forwardly of the bale-forming section of the belt arrangement;

a fixed-position upper bale-forming roller located forwardly of the bale-forming section of the belt arrangement and located above the floor roller;

a powered feed roller located below the upper bale-forming roller, wherein the powered feed roller cooperates with the floor roller to define a crop inlet therebetween for receiving crop material from the crop pickup and feeding crop material rearwardly to a bale-forming chamber defined at least in part by the bale-forming roller and the bale-forming section of the belt arrangement, wherein the powered feed roller is movably mounted between the floor roller and the upper bale-forming roller, wherein movement of the powered feed roller relative to the floor roller functions to vary the size of the crop inlet, and wherein the powered feed roller is mounted between a pair of arm members pivotably interconnected with the round baler for movement about a pivot axis coincident with an axis of rotation defined by the upper bale-forming roller;

a biasing arrangement interconnected with the powered feed roller for biasing the powered feed roller toward a normal operating position in which the powered feed roller is spaced a first distance from the floor roller, and wherein the powered feed roller is movable against the force of the biasing arrangement to an expanded position greater than the first distance from the floor roller to accommodate an increase in thickness of the crop material; and a scraper member located between the powered feed roller and the upper bale-forming roller, wherein the scraper member is arranged to remove crop material from the powered feed roller and the upper bale-forming roller, wherein at least one of the powered feed roller and the upper bale-forming roller includes helical shearing structure which cooperates with the scraper member to shear crop material adhering thereto.

9. The round baler of claim 8, wherein both the powered feed roller and the upper bale-forming roller include helical shearing structure.

10. The round baler of claim 8, wherein the helical shearing structure includes a plurality of helical bars.

11. A crop inlet arrangement for a round baler including a crop pickup arrangement for moving crop material rearwardly and a belt arrangement defining at least one bale-forming section located rearwardly of the crop pickup arrangement, comprising:

a rotatable lower member located forwardly of the bale-forming section of the belt arrangement; and a rotatable upper member located above the lower member;

wherein the upper and lower rotatable members each define a crop engagement surface having irregular surface structure including raised portions that extend outwardly from a surface of the respective rotatable member and in a direction along an axis of rotation defined by the respective rotatable member, wherein the irregular surface structure comprises helical bar structure extending outwardly from the surface of each of the rotatable members for positively engaging the crop material;

wherein the upper and lower rotatable members are spaced apart from each other to define a crop inlet located therebetween, and wherein the upper and lower members rotate in opposite directions and the helical bar structure of the upper and lower rotatable members cooperates to feed crop material from the pickup arrangement through the crop inlet and into the bale-forming chamber.

12. The crop inlet arrangement of claim 11, wherein the rotatable upper member comprises a powered feed roller, and wherein the powered feed roller is movable toward and away from the rotatable lower member to vary the size of the crop inlet.

13. The crop inlet arrangement of claim 12, wherein the powered feed roller is movable between a normal operating position in which the crop inlet is defined by a space between the powered feed roller and the lower member, and an expanded position which increases the size of the space to accommodate an increase in thickness of the crop material.

14. The crop inlet arrangement of claim 13, further comprising a biasing arrangement for biasing the powered feed roller toward its normal operating position.

15. The crop inlet arrangement of claim 13, wherein the biasing arrangement comprises one or more springs.

16. The crop inlet arrangement of claim 13, wherein the lower member comprises a floor roller.

17. The crop inlet arrangement of claim 16, wherein the floor roller comprises a forward floor roller, and further comprising a rear floor roller located rearwardly of the forward floor roller and cooperating with the forward floor roller and the bale-forming section of the belt arrangement to define the bale-forming chamber.

18. The crop inlet arrangement of claim 16, wherein the powered feed roller is mounted between a pair of pivotable arm members, wherein the pivotable arm members are pivotable about a pivot axis coincident with an axis of rotation of an upper roller which at least in part defines the bale-forming chamber.

19. In a round baler for forming round bales of crop material, wherein the round baler includes a belt arrangement, the improvement comprising a fixed position upper bale-forming roller located forwardly of the belt arrangement, wherein the upper bale-forming roller and the belt arrangement cooperate to at least in part define a bale-forming chamber, and a pair of powered rollers located forwardly of the bale-forming chamber, wherein the pair of powered rollers are spaced apart from each other and define a crop inlet for receiving crop material from the pickup and feeding crop material into the bale-forming chamber, wherein a first one of the pair of powered rollers comprises a rotatable lower feed roller and a second one of the pair of powered rollers comprises an upper powered feed roller located above the rotatable lower feed roller, wherein the crop inlet is defined by a space located between the upper powered feed roller and the lower feed roller, and wherein the upper powered feed roller is movable toward and away from the lower feed roller in an arcuate path about a pivot axis, wherein the pivot axis is coincident with an axis of rotation of the fixed position upper bale-forming roller, wherein movement of the upper powered feed roller toward and away from the lower feed roller is operable to vary the size of the crop inlet defined between the pair of powered rollers.

20. The improvement of claim 19, wherein the upper powered feed roller is driven in response to rotation of the upper bale-forming roller.

21. The improvement of claim 19, further comprising a biasing arrangement interconnected with the upper powered feed roller, wherein the biasing arrangement is operable to bias the upper powered feed roller toward a first position relative to the lower feed roller, wherein the upper powered feed roller is pivotable about the pivot axis away from the first position to increase the size of the space between the upper powered feed roller and the lower feed roller defining the crop inlet, against the force of the biasing arrangement, to accommodate an increase in thickness of crop material introduced into the crop inlet.

22. In a round baler for forming round bales of crop material, wherein the round baler includes a belt arrangement and a pickup, the improvement comprising an upper bale-forming roller located forwardly of the belt arrangement, wherein the upper bale-forming roller and the belt arrangement cooperate to at least in part define a bale-forming chamber, and a pair of powered rollers located forwardly of the bale-forming chamber, wherein the powered rollers are spaced apart from each other and define a crop inlet for receiving crop material from the pickup and feeding crop material into the bale-forming chamber, wherein one of the powered rollers comprises a rotatable lower roller and the other of the powered rollers comprises a powered feed roller located above the rotatable lower roller, wherein the crop inlet is defined by a space located between the powered feed roller and the lower roller, and wherein the powered feed roller is movable relative to the lower roller about a pivot axis coincident with an axis of rotation of the upper bale-forming roller to vary the size of the crop inlet, wherein the powered feed roller is spaced from the upper bale-forming roller, and further comprising scraper structure located in the space between the upper bale-forming roller and the powered feed roller, wherein the scraper structure includes a first scraping edge located adjacent the upper bale-forming roller and a second scraping edge located adjacent the powered feed roller for removing crop material adhering thereto.

23. The improvement of claim 22, wherein the powered feed roller is mounted between a pair of arm members pivotably interconnected with the baler, and wherein the scraper structure is mounted to and extends between the pair of arm members.

24. A round baler for forming round bales of crop material, comprising:

a crop pickup arrangement;

a belt arrangement located rearwardly of the crop pickup arrangement and defining a bale-forming section between a pair of rolls associated with the round baler;

a rear floor roller located forwardly of the bale-forming section of the belt arrangement;

a front floor roller located forwardly of the rear floor roller;

an upper bale-forming roller spaced above the front and rear floor rollers and forwardly of the bale-forming section of the belt arrangement; and a movable powered feed roller located between the upper bale-forming roller and the front floor roller, wherein the powered feed roller and the front floor roller cooperate to define a crop inlet for feeding crop material into a bale-forming chamber defined by the upper bale-forming roller, the rear floor roller and the bale-forming section of the belt arrangement, wherein the powered feed roller is selectively movable toward and away from the front floor roller for varying the size of the crop inlet;

wherein the front floor roller and the powered feed roller include helical bar structure extending outwardly from a surface defined by each of the front floor roller and the powered feed roller for positively engaging the crop material and feeding the crop material from the crop inlet toward the rear floor roller.

25. A round baler for forming round bales of crop material, comprising:

a crop pickup arrangement;

a belt arrangement located rearwardly of the crop pickup arrangement and defining a bale-forming section between a pair of rolls associated with the round baler;

a bale support arrangement located forwardly of the bale-forming section of the belt arrangement, and including a forward floor roller; and a closed upper bale forming and crop feeding assembly which cooperates with the belt arrangement and the bale support arrangement to define a bale-forming chamber, wherein the upper bale forming and crop feeding assembly comprises a fixed position rotatable upper bale-forming roller and a movably mounted powered feed roller, wherein the forward floor roller and the powered feed roller are spaced apart from each other to define a crop inlet therebetween which receives crop material from the crop pickup arrangement, and wherein the powered feed roller is selectively movable away from the forward floor roller about a pivot axis that is coincident with an axis of rotation of the rotatable upper bale-forming roller, to accommodate an increase in thickness of crop material introduced into the crop inlet.

26. The round baler of claim 25, further comprising biasing means for urging the powered feed roller to a normal operating position in which the powered feed roller is spaced a first distance from the forward floor roller, and wherein the powered feed roller is movable against the force of the biasing means away from the normal operating position.

27. The round baler of claim 26, wherein the powered feed roller is mounted to and extends between a pair of arm members pivotably interconnected with the round baler, wherein the pair of arm members provide movement of the powered feed roller in an arcuate path about the pivot axis toward and away from the forward floor roller.

28. The round baler of claim 26, wherein one of the baler rolls comprises a movable belt guide roll with which the belt arrangement is engaged, wherein the belt guide roll is located adjacent the upper bale-forming roller and is mounted between a pair of arms, wherein the arms are pivotably interconnected with the baler for movement about a pivot axis coincident with an axis of rotation defined by the upper bale-forming roller.

29. The round baler of claim 25, wherein the forward floor roller and the powered feed roller include irregular surface structure for positively engaging the crop material and feeding the crop material from the crop inlet toward the bale support arrangement.

30. A round baler for forming round bales of crop material, comprising:

a crop pickup arrangement;

a belt arrangement located rearwardly of the crop pickup arrangement and defining a bale-forming section between a pair of rolls associated with the round baler;

a bale support arrangement located forwardly of the bale-forming section of the belt arrangement, and including a forward floor roller; and a closed upper bale forming and crop feeding assembly which cooperates with the belt arrangement and the bale support arrangement to define a bale-forming chamber, wherein the upper bale forming and crop feeding assembly comprises a fixed position upper-bale-forming roller and a movably mounted powered feed roller, wherein the forward floor roller and the powered feed roller are spaced apart from each other to define a crop inlet therebetween which receives crop material from the crop pickup arrangement, and wherein the powered feed roller is selectively movable away from the forward floor roller to accommodate an increase in thickness of crop material introduced into the crop inlet, wherein the upper bale-forming roller and the powered feed roller rotate in opposite directions of rotation, and wherein the closed upper bale forming and crop feeding assembly further includes a scraper arrangement located between the upper bale-forming roller and the powered feed roller, wherein the scraper arrangement includes first and second scraping edges located adjacent the upper bale-forming roller and the powered feed roller, respectively, for removing crop material adhering thereto.

\* \* \* \* \*

UNITED STATES PATENT AND TRADEMARK OFFICE
CERTIFICATE OF CORRECTION

PATENT NO. : 6,655,121 B1
DATED : December 2, 2003
INVENTOR(S) : Kim P. Viesselmann et al.

It is certified that error appears in the above-identified patent and that said Letters Patent is hereby corrected as shown below:

<u>Title page,</u>
Item [73], Assignee, please delete "Bond" and substitute therefore -- Bend --.

<u>Column 11,</u>
Line 27, delete "13" and substitute therefore -- 14 --.

Signed and Sealed this

Sixth Day of April, 2004

JON W. DUDAS
*Acting Director of the United States Patent and Trademark Office*